United States Patent [19]

Housholder

[11] 3,786,931

[45] Jan. 22, 1974

[54] OPTICS INDEX FILING SYSTEM

[76] Inventor: Ross F. Housholder, 1725 Brooks Dr., Arlington, Tex. 76012

[22] Filed: Dec. 7, 1972

[21] Appl. No.: 313,146

[52] U.S. Cl. .................... 211/40, 312/10, 312/223, 350/96 R

[51] Int. Cl. .................... A47b 63/00, G02b 5/14

[58] Field of Search ....... 312/10, 50, 183, 223, 234, 312/234.1; 211/1, 40, 50; 350/96 R, 96 B

[56] References Cited

UNITED STATES PATENTS 3,275,158 9/1966 Glass et al. .......................... 211/40

*Primary Examiner*—Bobby R. Gay
*Assistant Examiner*—William E. Lyddane
*Attorney, Agent, or Firm*—Arthur F. Zobal; Wofford, Felsman & Fails

[57] ABSTRACT

The specification discloses an optics index filing system for allowing records, files, etc. to be filed in a random manner and to be readily identified and retrieved when needed. The system comprises a frame forming a storage zone adapted to hold a plurality of records, files, etc. An optics selector system is employed for identifying the records or files stored. In the preferred embodiment the selector system comprises a plurality of light pipes having ends located in a column or row forming an index observable to the user. The other ends of the light pipes are located at spaced and distinct positions to receive light individually from a movable light emitting selector slit when shifted to different positions. Each record or file folder has a light pipe having one end to be located in alignment with one of said other ends of the index light pipes, when the folder is filed, to receive light from the selector slit when the selector slit is shifted to different positions. The other ends of the light pipes of the record or file folders are located at a position to be observable to the user.

7 Claims, 7 Drawing Figures

OPTICS INDEX FILING SYSTEM

BACKGROUND OF THE INVENTION

In the filing and storage of records, files, etc., a filing and retrieval system has been desired which allows the records or files to be filed in a random manner and yet which can be readily identified and retrieved when needed.

SUMMARY OF THE INVENTION

It is the object of the present invention to provide such a system which is simple an inexpensive. The filing system comprises supporting frame means forming a storage zone adapted to hold a plurality of records, files, etc. Also provided is an index for identifying the records or files in the storage zone. Each record or file has a light transparent means located at a distinct position relative to that of each other record or file. In addition, there is provided selector means including light means adapted to selectively form a thin lighted area next to each of the light transparent means of each of the records or files when stored in the storage zone to light up the light transparent means of the record or file corresponding to the record or file selected.

In the preferred embodiment, there are provided a plurality of index light pipes each of which has one end located in a column or row and observable to the user and an other end located at a spaced and distinct position to receive light from a selector slit when the selector slit is moved to different selector positions. Each record or file has a light pipe having one end to be located in alignment with one of said other ends of said index light pipes, when the records or files are stored in said storage zone, to receive light from the selector slit when the selector slit is moved to different selector positions. The other ends of said record or file light pipes are located to be observable to the user when the records or files are stored in the storage zone.

In another embodiment, there are provided a plurality of spaced light transparent slits located at distinct positions in an index opaque member. The light transparent means of each record or file comprises an opaque member having a slit to be located in alignment with one of the light transparent slits of the index opaque member when the records or files are stored in the storage zone. A selector slit is adapted to be moved selectively next to the light transparent slits of the index opaque member and next to the light transparent slit of each file to simultaneously light up one of the slits of the index opaque member and the slit of the light transparent means of the corresponding file.

In a further embodiment, there are provided a plurality of light transparent slits located at fixed distances from each other and formed in wall structure of the frame forming a part of the storage zone against which the edges of the records or files will be located when stored in the storage zone. A plurality of light means are provided each of which is located to emit light through one of the slits when energized. Each record or file has a light pipe with one end to be located in alignment with one of the slits when the records or files are stored in the storage zone to selectively receive light from its slit when its associated light means is energized. Switch means is provided for selectively energizing each light means corresponding with the record or file desired.

DETAILED DESCRIPTION OF THE INVENTION

Figures 1, 2, 3:
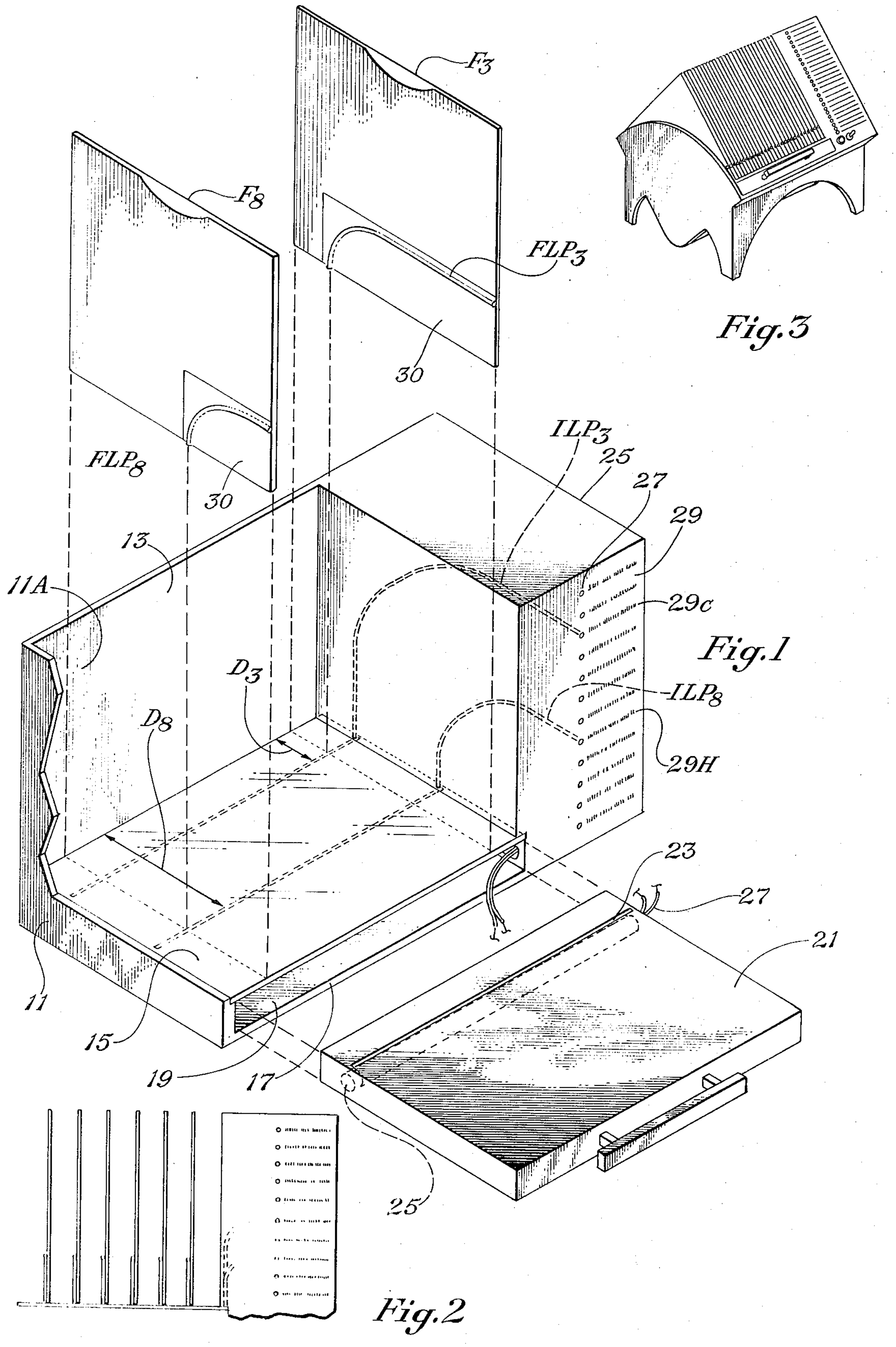
FIG. 1 illustrates an optics index filing system employing light pipes for selecting the files desired.
FIG. 2 is a partial front view of the filing system of FIG. 1.
FIG. 3 illustrates the system of FIG. 1 when supported on a stand.

Referring now to FIGS. 1–3, there will be described the optics index filing system which employs light pipes or fiber optics for the index and for the records or files for allowing quick identification and retrieval of the records or files to be stored. The system comprises a frame 11 forming a storage zone 13 for holding a plurality of files or file folders or holders, two of which are identified at $F_3$ and $F_8$. These files may be employed for storing written records and data or, for example, phonograph records. In storing the files, they may be inserted in the storage zone 13 in a random manner and yet readily identified for retrieval when needed.

The bottom of the zone 13 upon which the files rest is formed by a glass plate identified at 15. Formed below the glass plate 15 is a shelf 17 having an opening 19 in which a selector mechanism or tray 21 is adapted to be inserted. Formed across the selector 21 is a slit 23 through which light shines or passes from an elongated electrical bulb illustrated at 25. The selector 21 is adapted to be inserted within the opening 19 and slid to various positions which moves the slit 23 to various positions relative to the transparent glass bottom 15. The bulb 25 may be a neon bulb having an extra length of electrical connections 27 coupled thereto to allow the selector 21 to be moved or slid to various positions in the opening. The connections are coupled to a wall outlet for energizing the bulb 15 when actuated by a switch, not shown.

An enclosed cabinet 25 is located to one side of the zone 13 and contains a plurality of light pipes or fiber optics members. Two of the light pipes are identified at $ILP_3$ and $ILP_8$. Each light pipe has one end (a front end) located in a vertical column illustrated at 27 which is readily viewable by the user. Next to these ends of the light pipes are located or attached identification data illustrated at 29 which form the index for identifying the files stored in the bin. The other end of each light pipe extends downward and to the side of the column 27 and next to the glass bottom 15 as illustrated in FIG. 2. The lower ends of the light pipes are spaced apart at equal and distinct distances along the width of the glass bottom 15 with respect to the back wall 11A. For example index light pipe $ILP_3$ has its lower end located a distance $D_3$ from the back wall 11A while index light pipe $ILP_8$ has its lower end located at a distance $D_8$ from the back wall 11A. In one embodiment the lower ends of the light pipes are spaced apart from each other one-eighth of an inch. They are located in a row at a position sufficient to receive light individually from the slit 23 as it is located selectively below the lower ends of the light pipes.

Each record or file folder or holder also has a light pipe secured thereto. Each file light pipe has one end (a front end) located at the front of the file to be observed by the user while the other end is located at the bottom and points downward toward the glass bottom 15. The lower end of each file light pipe corresponds with or will be in alignment with the lower end of one of the index light pipes relative to the back wall 11A when the files are stored in place. For example, file light pipe $FLP_3$ has its bottom end located at a distance $D_3$ from the back end of the file $F_3$. File light pipe $FLP_8$ has its bottom end located at a distance $D_8$ from the back end of the file $F_8$. The front ends of all of the light pipes of the files are located at the same level from the bottom of the files as illustrated in FIG. 2.

The system is used by inserting the file folders at random in the storage zone or bin with their back ends adjacent the back wall 11A. When it is desired to select a given file as determined by the master index 29, the selector 21 is moved inward or outward in the opening 19 with the bulb 25 lit to light up one of the light pipes in column 27 corresponding to the file desired. When this occurs, the front end of the corresponding file light pipe will simultaneously light up to allow one to readily identify the file to which the file light pipe is attached.

Assume that it is desired to select the file identified by the index data 29C next to the front end of index light pipe $ILP_3$. When the selector is moved to a position whereby the slit 23 is at the position $D_3$, light simultaneously will be transmitted from the slit 23 through light pipe $ILP_3$ to its front end and through light pipe $FLP_3$ to its front end. Thus the front end of index light pipe $ILP_3$ on the front of the cabinet 25 will be lit up and the front end of the file light pipe $FLP_3$ of file $F_3$ also will be simultaneously lit up to readily allow one to select the file folder $F_3$. Since the lower ends of the other index light pipes and of the other file folder light pipes will be located at different distances from back wall 11A, light from the selector slit 23 cannot pass through these light pipes and their front ends will all remain dark.

Assume now that it is desired next to select file folder identified by the index data 29H. The selector 21 will be withdrawn further outward until the slit 23 reaches distance $D_8$. At this position the front end of the index light pipe $ILP_8$ will be lit up and simultaneously the front end of the file light pipe $FLP_8$ of file $F_8$ will be lit up. Thus when it is desired to retrieve a sought after file after having been randomly stored, one merely has to observe the front end of its corresponding index light pipe and the row of light pipe ends on the file folders while moving the selector 21 inward or outward with the bulb 25 lit. When the front end of the chosen index light pipe lights up, the light pipe on the corresponding file folder will simultaneously light up, thereby allowing easy and rapid identification of the sought after file.

In one embodiment, the light pipes employed for the index and on the file folders have a diameter of about 0.020 of an inch. The lower ends of the index light pipes are spaced apart about one-eighth of an inch as indicated above. The file folder light pipes are attached to each other such that their lower ends are spaced apart one-eighth of an inch relative to each other. The file folder light pipes are attached to the file folders with suitable strips of tape 30 although they may be attached in a different manner if desired. The selector slit 23 may have a width of about one-sixteenth of an inch.

Figures 4, 5, 6, 7:
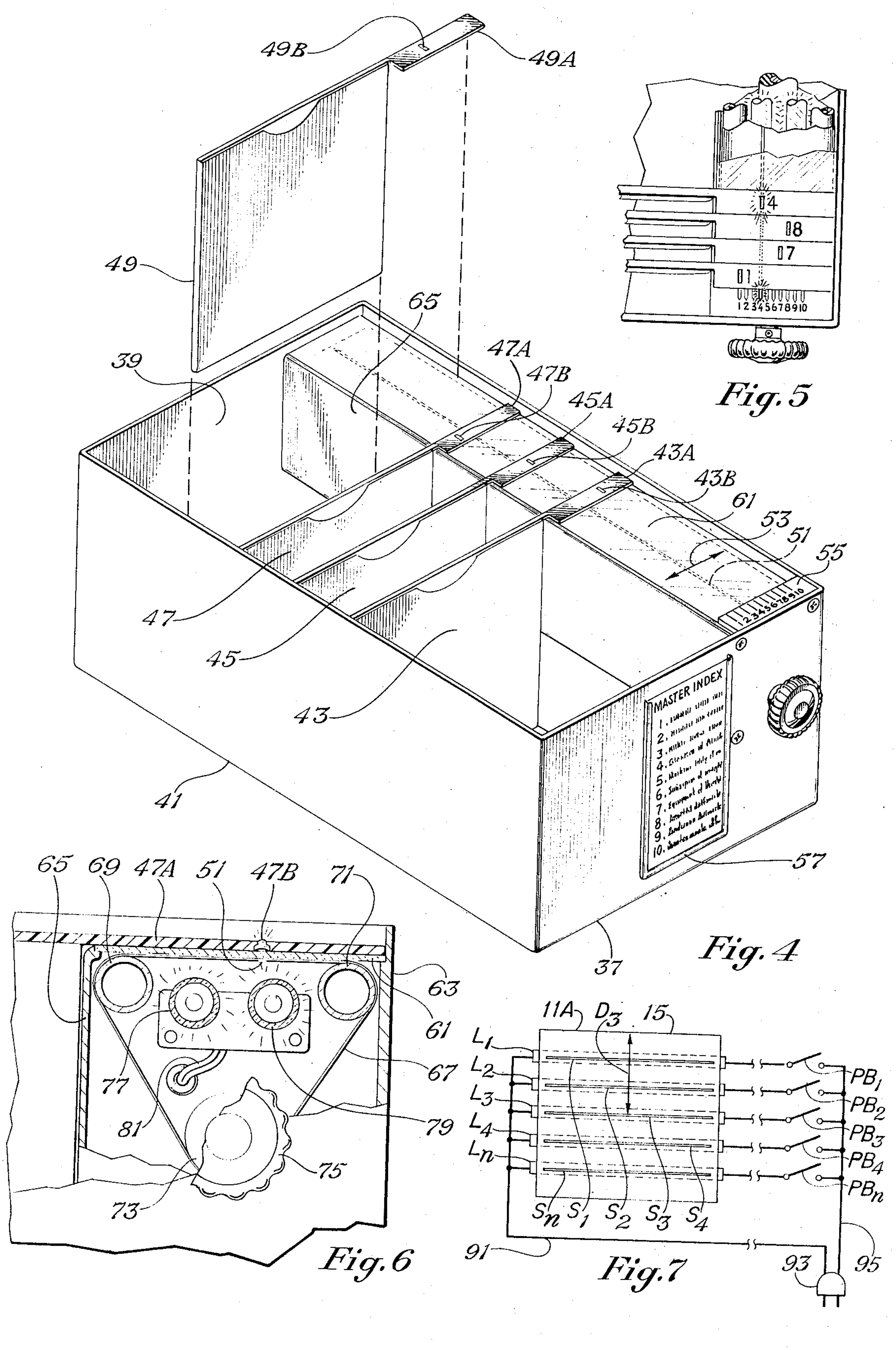
FIG. 4 is another embodiment of an optics index filing system.
FIG. 5 is an enlarged partial cross-sectional view of the system of FIG. 4.
FIG. 6 is an enlarged partial cross-sectional view taken through a portion of the system of FIG. 4.
FIG. 7 schematically illustrates another embodiment of the present invention.

Referring now to FIGS. 4–6, there will be described another embodiment light allowing random filing of records or files. In this system, a file drawer 37 having a filing zone 39 is employed to hold a plurality of file folders illustrated at 43, 45, 47, and 49. When filed in place, the right hand edges of the files will abut against an interior wall 65. Each file folder has an opaque tab 43A, 45A, 47A, and 49A coupled thereto at its top right end and which has its flat surface located in a plane transverse to the plane of the file folder. Each opaque tab has a transparent slit located at a distinct and different position along the length of the tab as illustrated at 43B, 45B, 47B, and 49B. A selector mechanism also is provided and which comprises an elongated slit 51 adapted to be moved or shifted crosswise below the tabs in the direction of the arrows illustrated at 53. A lighting mechanism is employed below the slit to pass light through the slit as it is moved to different positions. An index indicator 55 is located at the front of the file drawer and also comprises an opaque member having a plurality of slits located and spaced apart at distinct positions. These slits are identified by numbers 1–10 on the indicator 55. The position of each slit on the indicator 55 corresponds with or will be in alignment with the position of one of the slits on the opaque tabs of the files relative to the interior wall 65 when the files are stored in place. A master index illustrated at 57 is located on the front of the file drawer. The numbers of the master index correspond with the slit numbers of the index indicator.

In selecting a particular file, one will observe the master index to choose the file desired. Assume that he choses the file next to No. 2 of the master index. The selector slit 51 then will be moved crosswise to line up with the No. 2 position of the index indicator 55. When this occurs, the slit 51 will also be located directly below the slit 47B of tab 47A of file 47. Thus the light will shine through slit 2 of the index indicator 55 and through the slit 47B of the file 47 to allow one to readily locate and retrieve the file 47 corresponding to the file indicated by the No. 2 position on the master index. Since the slits of the other tabs will not be in alignment with the selector slit 51 when it is located below tab slit 47B, the other tab slits will remain dark.

Referring now to FIGS. 5 and 6, there will be described one manner in which the selector slit 51 may be formed and moved crosswise to select the files desired. In FIG. 6, the tab 47A of file 47 is illustrated in enlarged form. A transparent glass plate 61 is provided for supporting the opaque tabs of the file folders. The glass plate 61 is supported by the side wall structure 63 of the file drawer and by the interior side wall structure 65 against which the right hand edges of the file folders abut when inserted in place. Supported within the enclosure formed by the wall 63, the plate glass 61, and the wall 65 is an opaque and flexible endless belt illustrated at 67 which is tightly fitted around rollers 69, 71, and 73. A knob 75 is connected to roller 73 for turning the roller and hence for moving the belt 67 in opposite directions. The slit 51 is a light transparency formed in the opaque belt 67. Also supported within the enclosure are a plurality of elongated lightbulbs illustrated at 77 and 79 which are energized by way of electrical connections illustrated at 81. The knob 75 may be rotated in opposite directions to move the selector slit 51 under the index slits and hence under the tab slits. In FIG. 6, the slit 51 is illustrated as positioned under the slit 47B of the tab 47A whereby light emitted by the lightbulbs will pass through the slit 51, through the glass plate 61, and hence through the slit 47B of the tab to allow identification of the desired file folder.

When the files are properly stored in place in the file cabinet, the front and rear edges of the opaque tabs of the files will abut against each other to allow light from the slit 51 essentially to pass only through the tab slit which is above the selector slit 51.

Referring now to FIG. 7, there will be disclosed another embodiment of the present invention which is based on the embodiment of FIG. 1. In the embodiment of FIG. 7, however, the index light pipes and the movable tray 21 will not be employed. In addition the bottom 15 of the storage zone 13 will be an opaque member having a plurality of elongated light transparent slits $S_1$–$S_n$ which are spaced apart at equal and distinct distances along the width of the botton 15 with respect to the back wall 11A. Each slit will be located to be in alignment with the bottom end of one of the file light pipes when the files or records are located in the storage zone. For example, slit $S_3$ will be located at a distance $D_3$ from the back wall 11A which will correspond with the distance of the bottom end of the file light pipe $FLP_3$ from the back edge of the file folder $F_3$. Located below each slit in a fixed position will be an elongated and narrow lightbulb. In FIG. 7 lightbulbs $L_1$–$L_n$ are illustrated as being located below slits $S_1$–$S_n$ respectively. One end of each lightbulb is connected to an electrical conductor 91 leading to a male plug illustrated at 93. The other end of each lightbulb $L_1$–$L_n$ is connected to a push-button switch. In FIG. 7, push-button switches $PB_1$–$PB_n$ are illustrated as being connected to lightbulbs $L_1$–$L_n$ respectively. Each push-button switch is adapted to contact its terminal all of which are coupled to an electrical conductor 95 connected to the male plug 93. The push-botton switches will be located in the column 27 of the cabinet 25. Thus each push-button switch will be next to one of the entries of the index 29 identifying the records or files stored in the storage zone. In operation, the plug 93 will be connected to an electrical outlet and the files stored in the storage zone with their backs next to the wall 11A. In selecting a desired file, the index 29 will be scanned and the push-button switch next to the index entry identifying the file desired will be pushed or closed. This will energize the lightbulb connected thereto whereby light will pass through its associated slit to transmit light through the file light pipe located at the position of the slit to illuminate the front end of the file light pipe to allow one to readily identify the file desired. For example, if the file desired is $F_3$, the user will depress push-button $PB_3$ thereby causing the light source $L_3$ to be energized and pass light through slit $S_3$. Light then will be transmitted through file light pipe $FLP_3$ causing the front end of this light pipe to be lit up to allow one to readily select the file folder $F_3$. When a given light bulb is lit, light will pass only through its associated slit and the other slits will remain dark. If desired, opaque light shields (not shown) may be located between adjacent lightbulbs and between adjacent slits to insure that light will pass only through one slit when its associated lightbulb is lit.

I claim:

1. An optics index filing system comprising:

supporting frame means forming a storage zone for holding a plurality of records, files, etc., an index for identifying the records or files in the storage zone, each record or file having a light transparent means located at a distinct position relative to that of each other record or file when said records or files are stored in said storage zone, and selector means including light means for selectively forming a thin lighted area next to each of the light transparent means of each of the records or files when stored in said storage zone whereby the light transparent means of the record or file corresponding to the record or file selected is illuminated.

2. The system of claim 1 comprising:

a plurality of indicator means corresponding with the records or files listed in said index, said selector means including a movable light transparent selector slit and a light emitting means for passing light through said slit, said selector slit being movable selectively next to each of said indicator means and next to each of said light transparent means of each of the records or files when stored in said storage zone whereby the light transparent means of the record or file corresponding to the indicator means selected is illuminated.

3. The optics index filing system of claim 2 wherein:

said indicator means comprises a plurality of light transparent indicator means, said selector slit being movable selectively next to each of the light transparent indicator means and next to each of the light transparent means of each of the records or files when stored in said storage zone thereby simultaneously illuminating one of the indicator means and the light transparent means of the corresponding file.

4. The optical index filing system of claim 3 wherein:

said indicator means each comprises a light pipe having one end located in a column or row and observable to the user and an other end located at a spaced and distinct position to receive light from the selector slit when the selector slit is moved to different selector positions, the light transparent means of each record or file comprises a light pipe having one end to be located in alignment with one of said other ends of said light pipes forming said indicator means, when said records or files are stored in said storage zone, to receive light from the selector slit when the selector slit is moved to different selector positions, the other ends of said record or file light pipes being located to be observable by the user when said records or files are stored in said storage zone.

5. The optical index filing system of claim 3 wherein:

said indicator means comprise a plurality of spaced light transparent slits formed in an index opaque member at distinct positions relative to each other, the light transparent means of each record file comprises an opaque member having a light transparent slit located to be in alignment with one of said light transparent slits of said index opaque member when said records or files are stored in said storage zone, the selector slit of said selector means being adapted to be moved next to the light transparent slits of said index opaque member and next to the light transparent slits of said opaque member of each file to simultaneously light up one of the slits of said index opaque member and the slit of the light transparent means of the corresponding file.

6. The system of claim 1 comprising:

a plurality of light transparent slits located at fixed distances from each other, said slits being formed in wall structure of said frame means forming a part of said storage zone against which the edges of the records or files will be located when stored in said zone, a plurality of light means, each of which is located to emit oight through one of said slits when energized, the light transparent means of each file being positioned such that it will be located next to one of said slits when the records or files are stored in said zone, and control means for selecting each record or file listed in said index and for selectively energizing each light means to light up the light transparent means of the record or file selected.

7. The system of claim 6 wherein:

the light transparent means of each record or file comprises a light pipe having one end to be located in alignment with one of said slits when said records or files are stored in said storage zone, to selectively receive light from its slit when its associated light means is energized, said control means comprises switch means for selectively energizing each light means.

* * * * *